INVENTOR.
ALEXANDER M. ALEXANDRESCU
BY Albert R. Gotrick
ATTORNEY

Sept. 10, 1957  A. M. ALEXANDRESCU  2,805,742
AUTOMATIC FLUID OPERATED TRANSMISSION SYSTEM
Filed Aug. 30, 1952  14 Sheets-Sheet 3

INVENTOR.
ALEXANDER M. ALEXANDRESCU
BY Albert R. Golrick
ATTORNEY

INVENTOR.
ALEXANDER M. ALEXANDRESCU
BY Albert R. Golrick
ATTORNEY

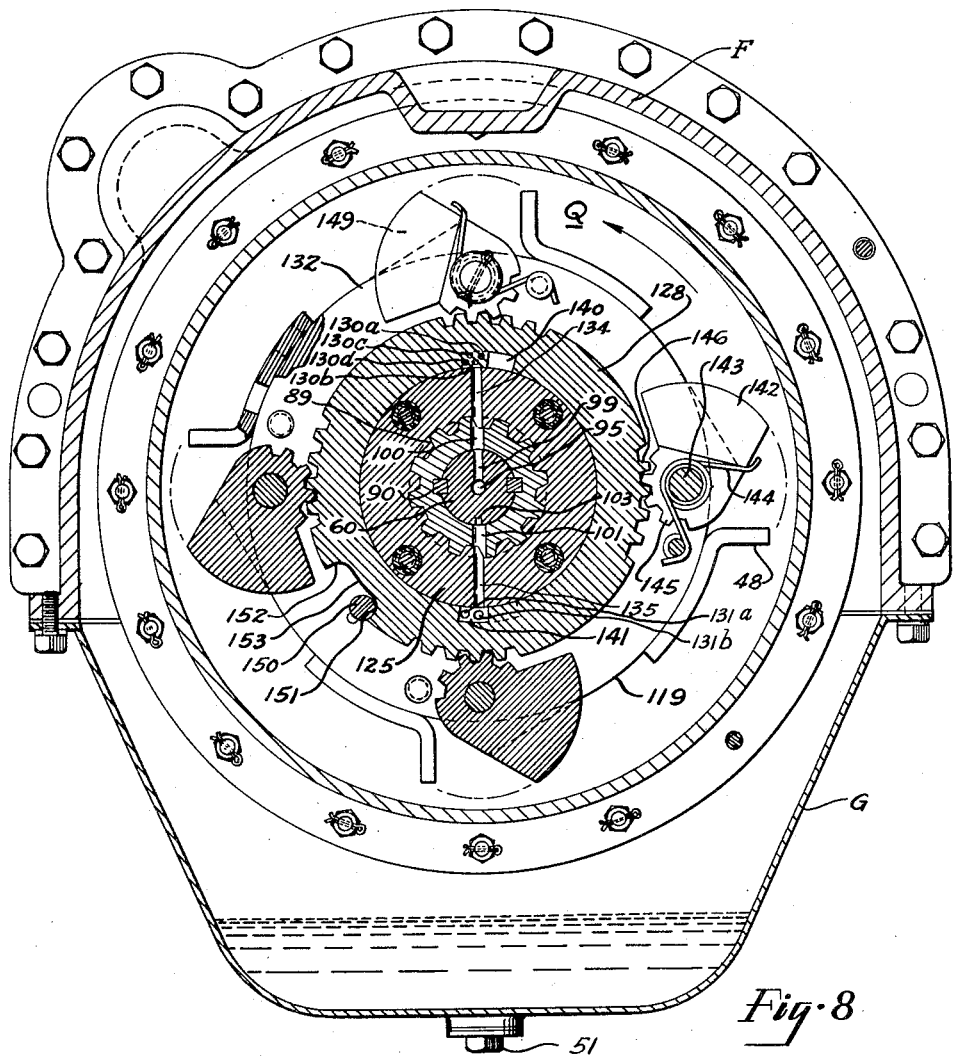

Sept. 10, 1957  A. M. ALEXANDRESCU  2,805,742
AUTOMATIC FLUID OPERATED TRANSMISSION SYSTEM
Filed Aug. 30, 1952  14 Sheets-Sheet 6

INVENTOR.
ALEXANDER M. ALEXANDRESCU
BY
Albert R. Golrick
ATTORNEY

Sept. 10, 1957  A. M. ALEXANDRESCU  2,805,742
AUTOMATIC FLUID OPERATED TRANSMISSION SYSTEM
Filed Aug. 30, 1952   14 Sheets-Sheet 7
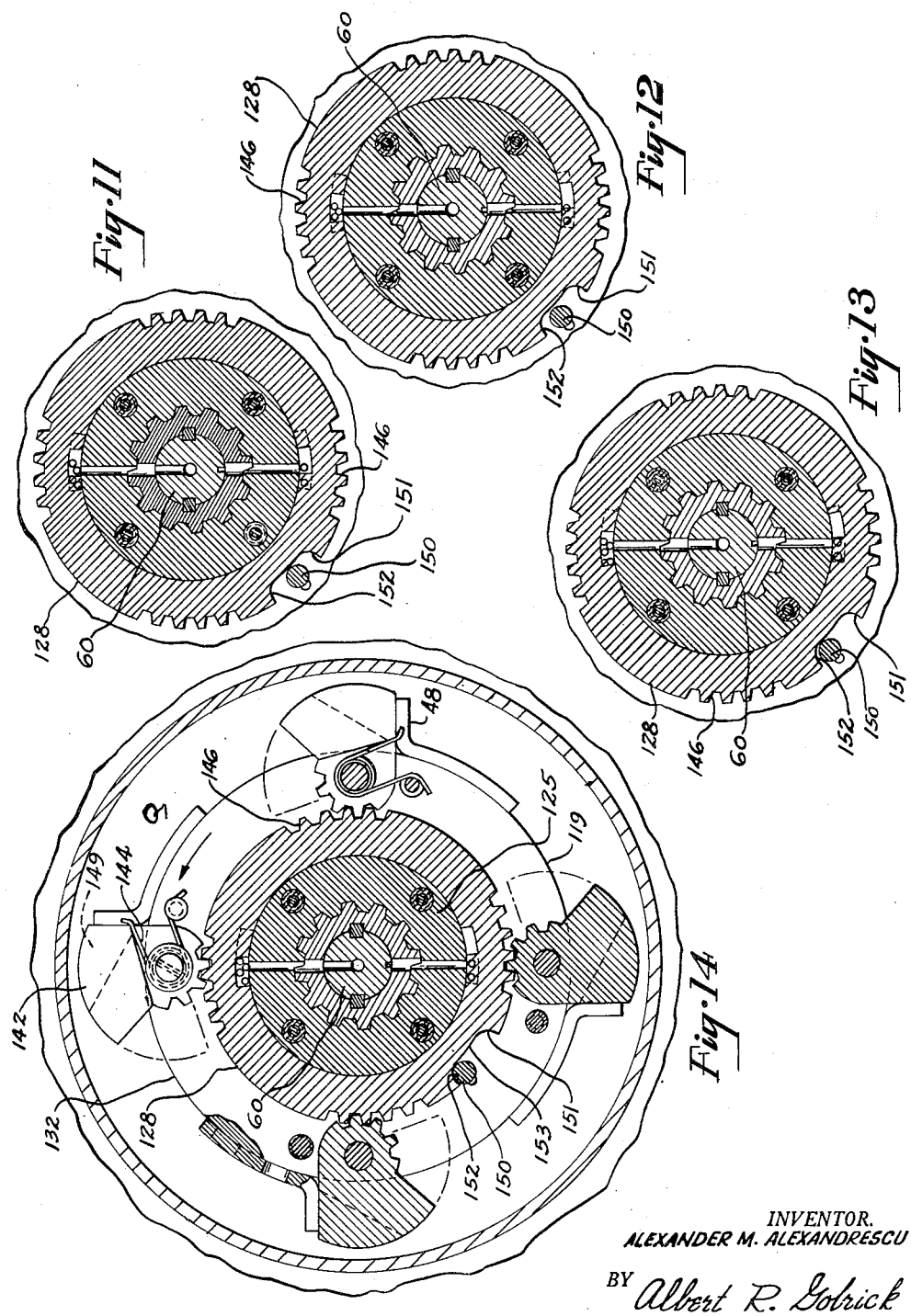
INVENTOR.
ALEXANDER M. ALEXANDRESCU
BY Albert R. Golrick
ATTORNEY

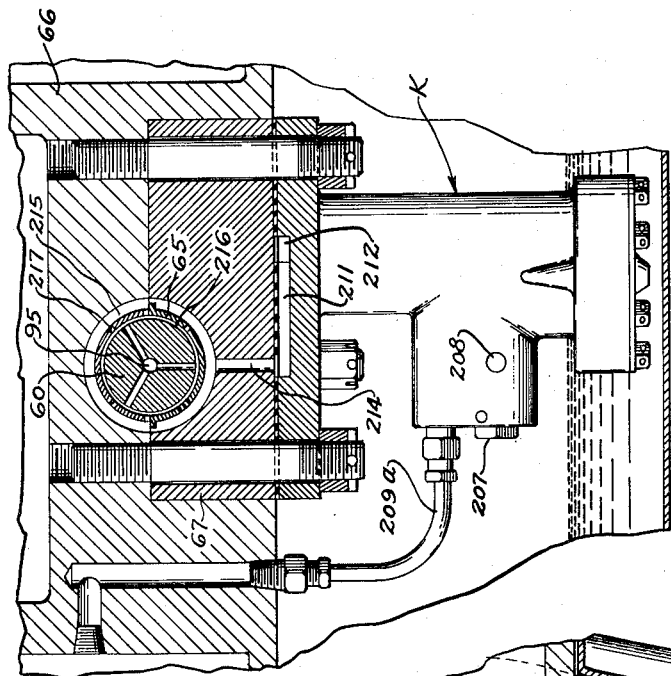
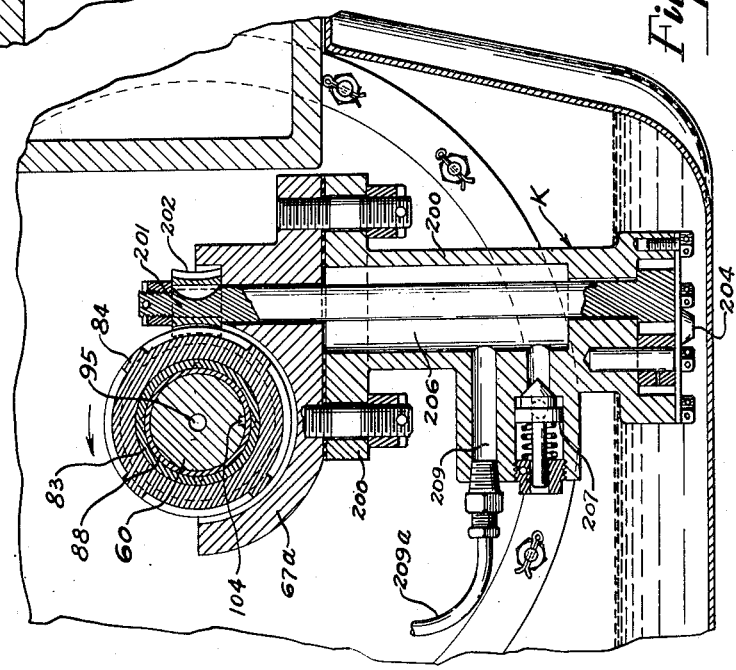

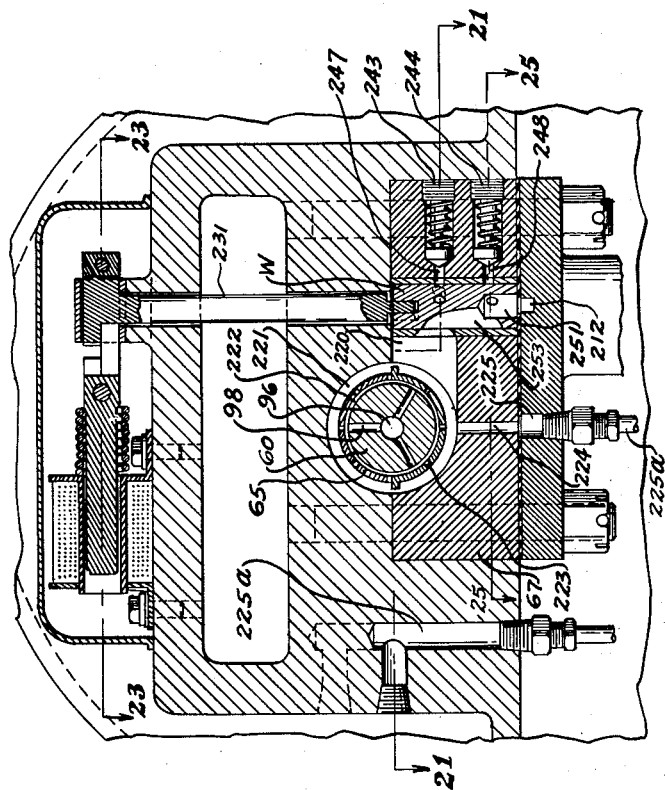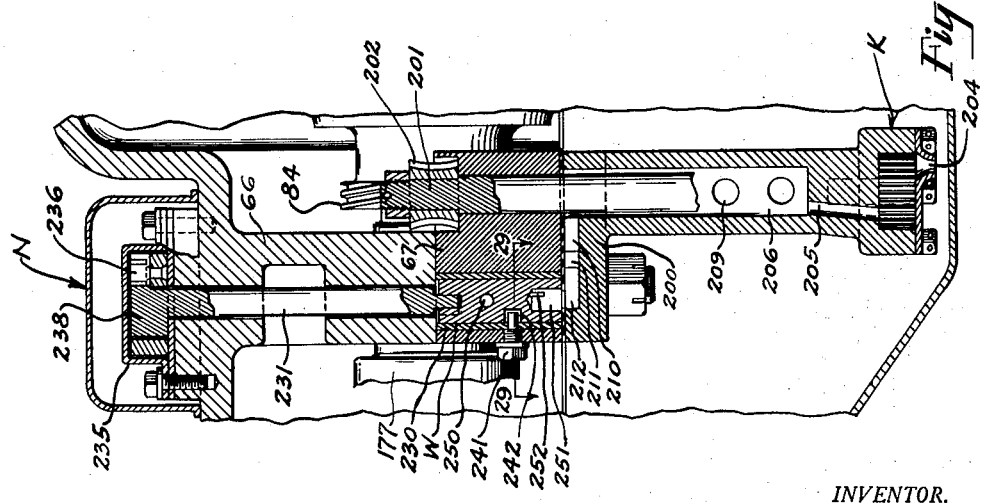

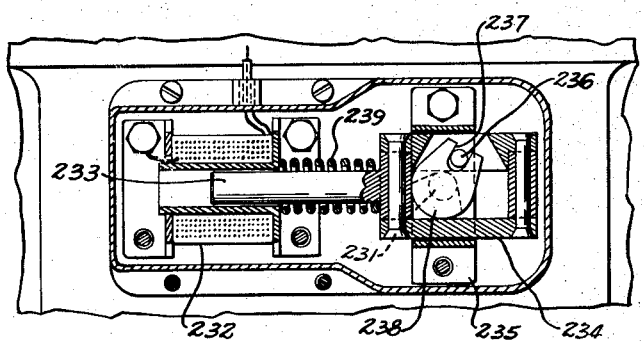
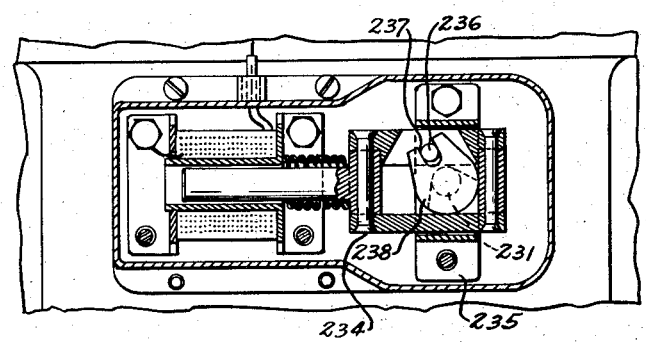
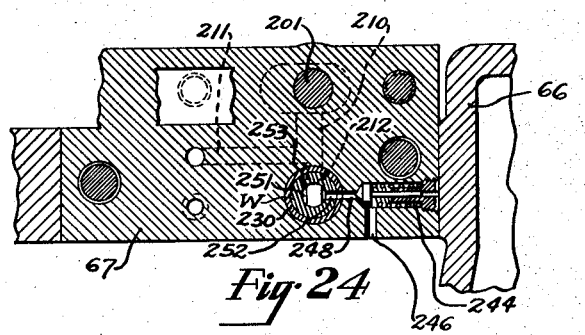
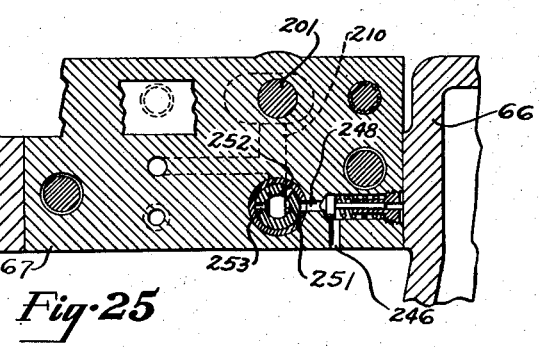

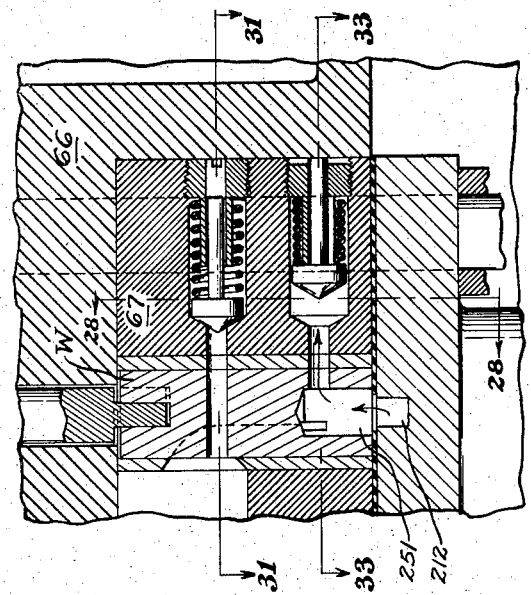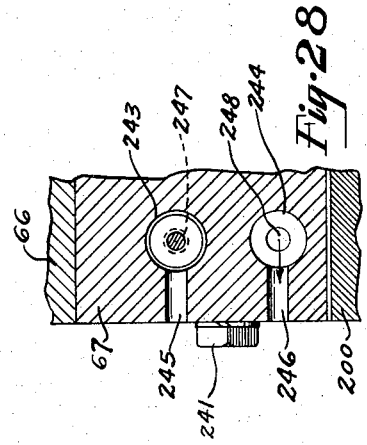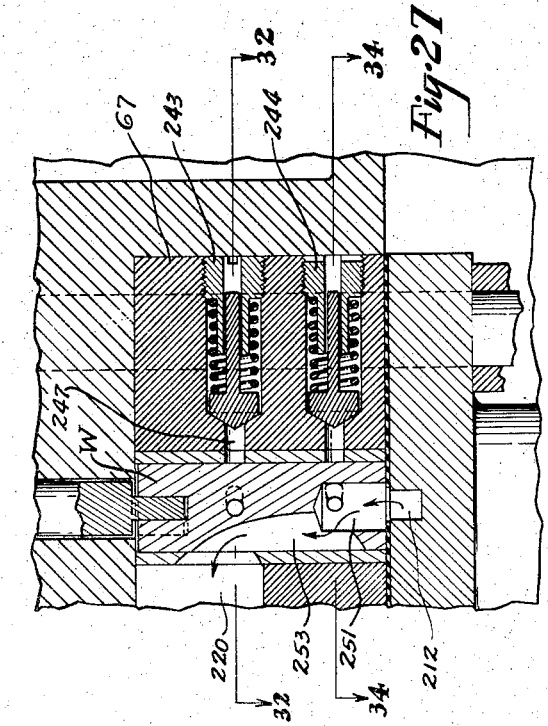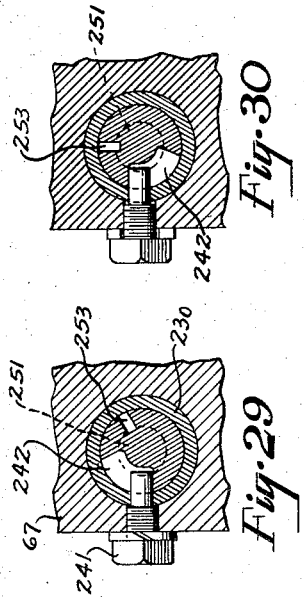

INVENTOR.
ALEXANDER M. ALEXANDRESCU
BY
Albert R. Golrick
ATTORNEY

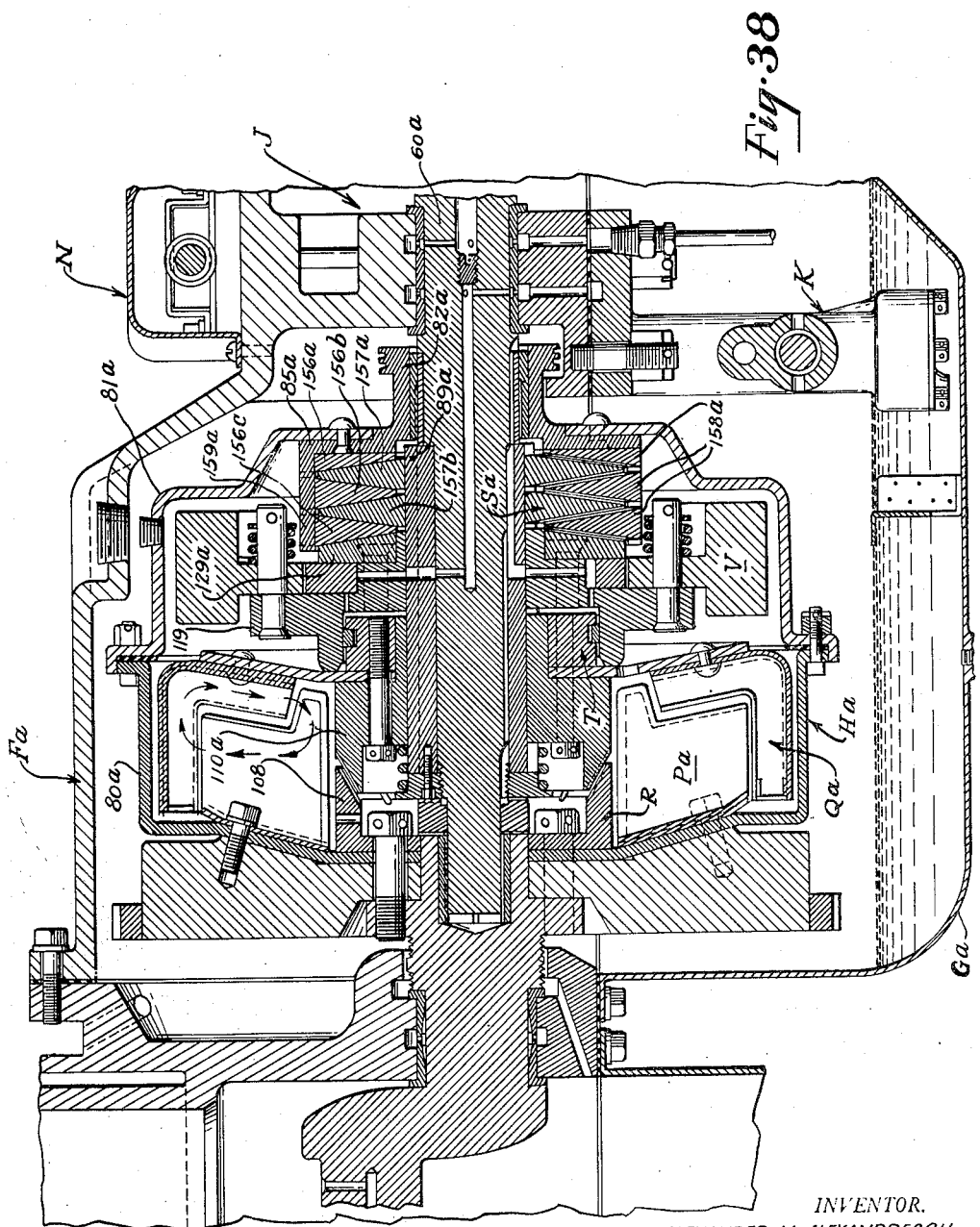

INVENTOR.
ALEXANDER M. ALEXANDRESCU
BY Albert R. Golrick
ATTORNEY

United States Patent Office 2,805,742
Patented Sept. 10, 1957

2,805,742

AUTOMATIC FLUID OPERATED TRANSMISSION SYSTEM

Alexander M. Alexandrescu, Cleveland, Ohio

Application August 30, 1952, Serial No. 307,206

15 Claims. (Cl. 192—.092)

The present invention relates to improvements in automatic fluid operated transmission systems and more particularly relates to improvements in transmissions and driving control systems such as that disclosed in my copending U. S. patent applications, Serial 174,100, (filed July 15, 1950), now abandoned, and 190,992 (filed October 19, 1950) of which this is a continuation in part, now Patent No. 2,723,736 dated November 15, 1955, 122,236, (filed October 19, 1949), now abandoned, 136,896 (filed January 5, 1950), now abandoned, 272,030 (filed February 18, 1952), now Patent No. 2,720,952 dated October 15, 1955 and in my U. S. Patent Number 2,569,087.

In the application Serial No. 272,030 an automatic fluid transmisison is disclosed comprising an improved fluid coupling device and modifications thereof in combination with an hydraulic safety driving clutch interposed between the coupling device and a gear shifting mechanism, with an automatic control system for regulating the flow of fluid from a pump associated with the coupling mechanism to the automatic safety driving clutch for actuation thereof and to a hydraulically operated and controlled gear shifting mechanism. The present invention involves a combination, with such, or similar, fluid projector and turbine, which comprise a fluid coupling assembly, of an improved automatically operated torque boosting clutch and an improved direct drive clutch, similar to those disclosed in applications Serial Nos. 174,100 and 190,992, which respond to increasing vehicle speed respectively to increase the torque effect of the fluid coupling system and at a higher speed to effect a direct drive through the unit. Further improvements relating to the automatic driving control valve shown in my prior applications are also disclosed.

An object of the present invention is the provision in a fluid coupling device of a speed responsive fluid operated torque boosting clutch mechanism. Another object is the provision in a fluid coupling unit of a speed responsive direct drive clutch. Another object is the provision of a speed responsive control system including an automatic fluid valving system for controlling a hydraulic piston and cylinder system serving to actuate a torque boosting clutch and a direct drive clutch combined with the fluid coupling system. A further object is the provision of an improved driving control system for a fluid separated transmission. Other objects and advantages of the invention will appear from the following description and the drawings wherein—

Fig. 4 is a detail in axial section of the main shaft and spline sleeve which support the fluid coupling unit and speed responsive torque boosting clutch;

Figure 1:
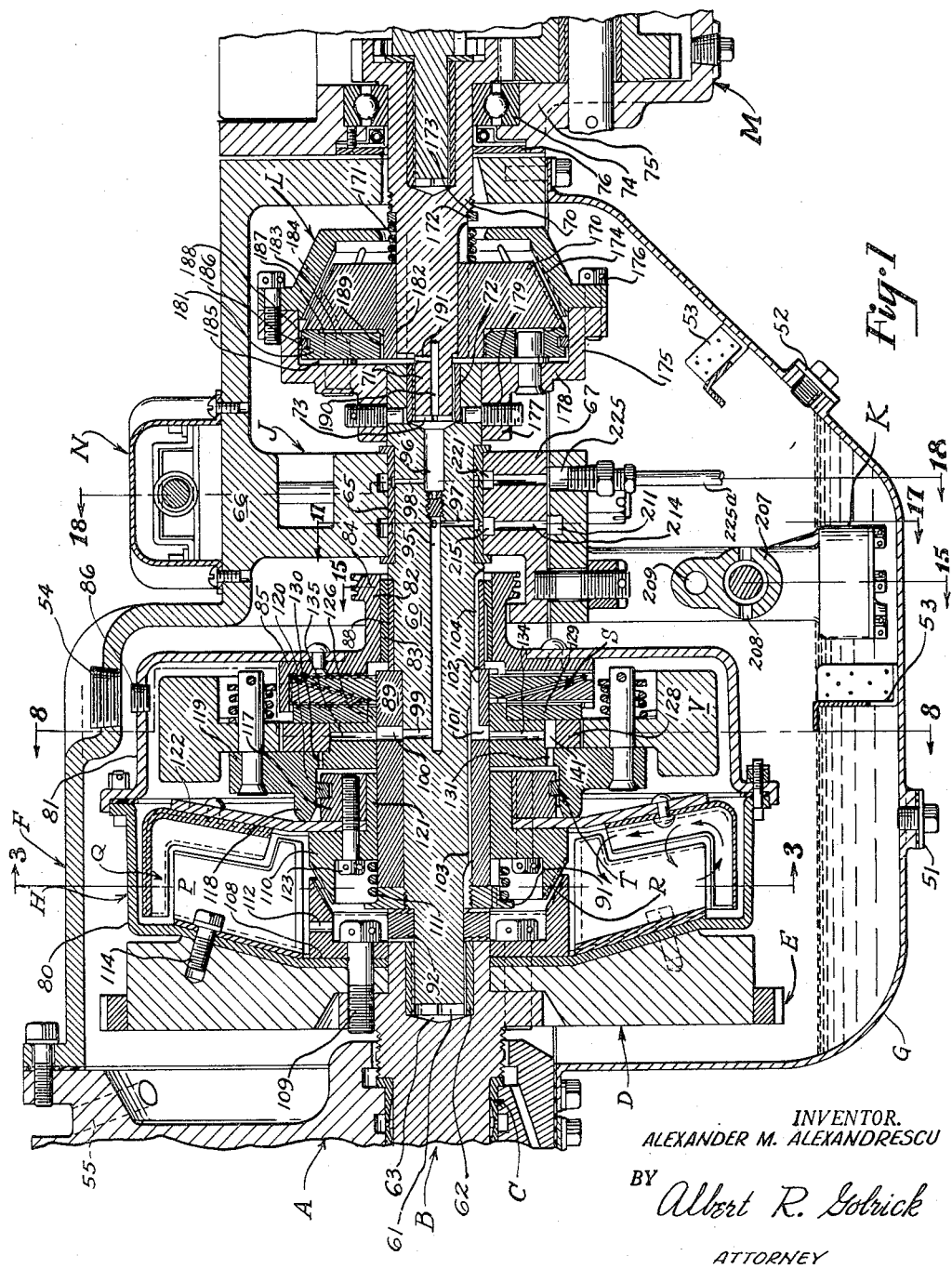
Fig. 1 is a longitudinal section taken at a vertical axial plane passing through the fluid coupling unit, the main or safety driving clutch, and a portion of the hydraulic gear shift mechanism, with the various elements being shown in the positions prevailing when the engine is not driving the vehicle or other mechanism to which connected.
Figure 2:
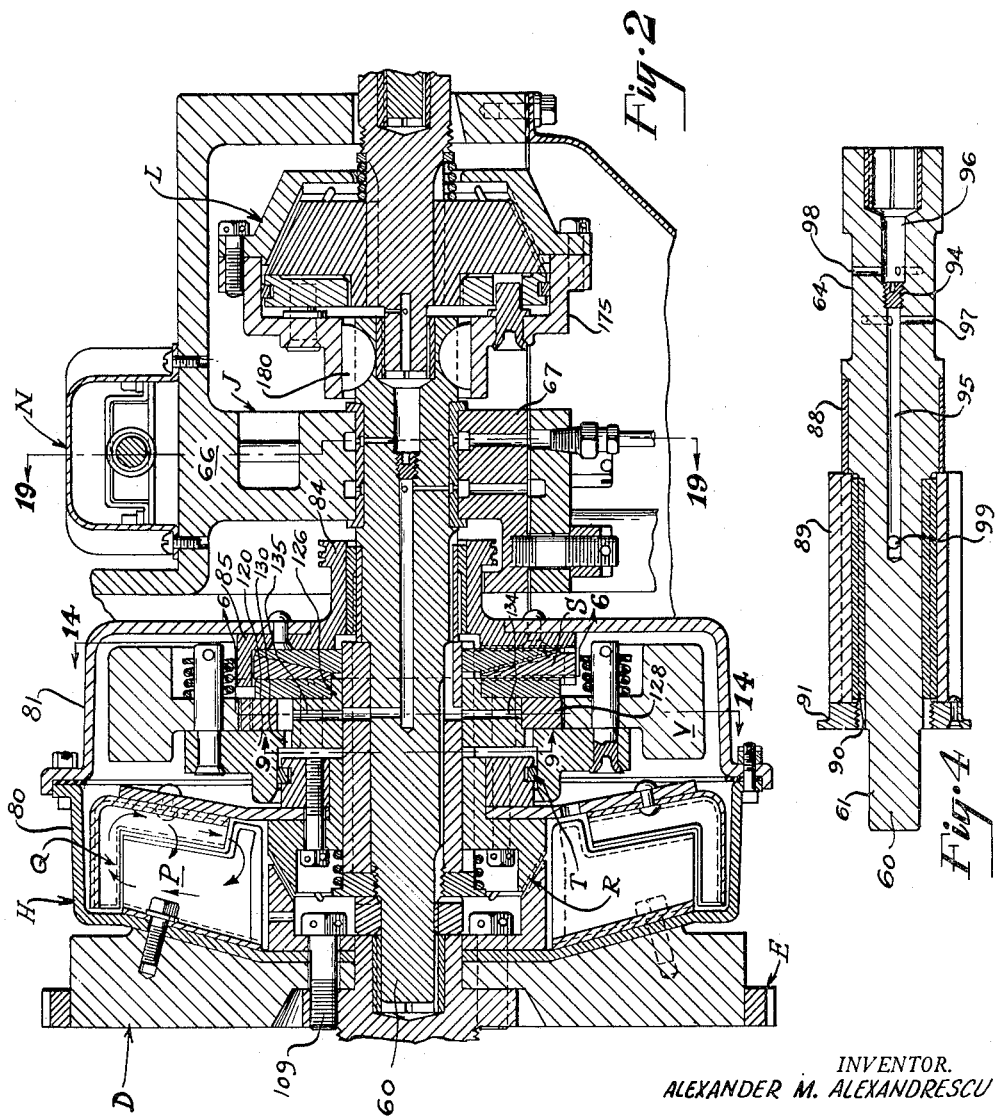
Fig. 2 is similar to Fig. 1 but shows the position of the various elements in the fluid driving unit and hydraulic safety clutch under full driving conditions.
Figure 20:
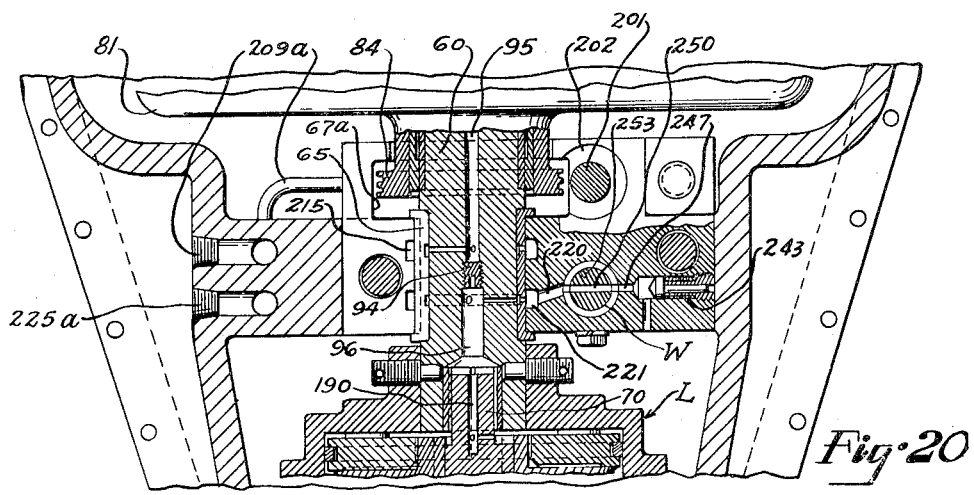
Figure 21:
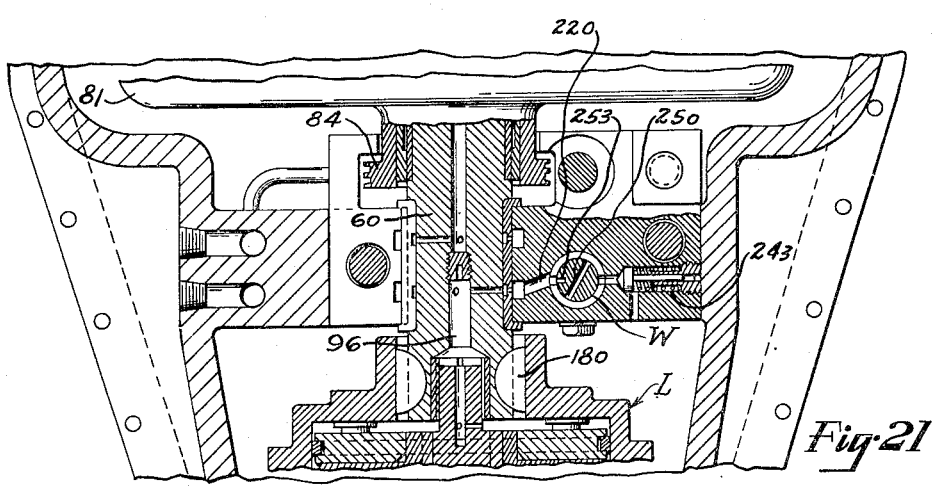
Figure 6:
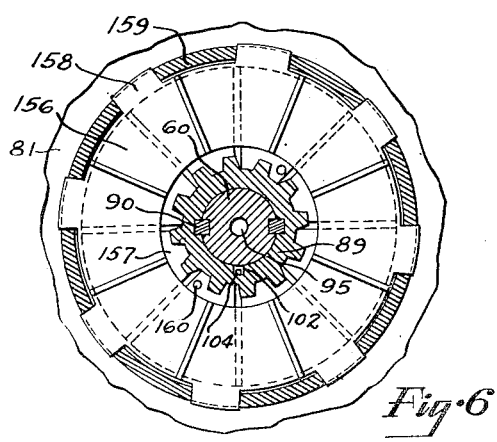
Fig. 6 is a fragmentary detail taken along the line 6—6 in Fig. 2 to show the arrangement of certain parts of the torque boosting clutch.
Figure 18:
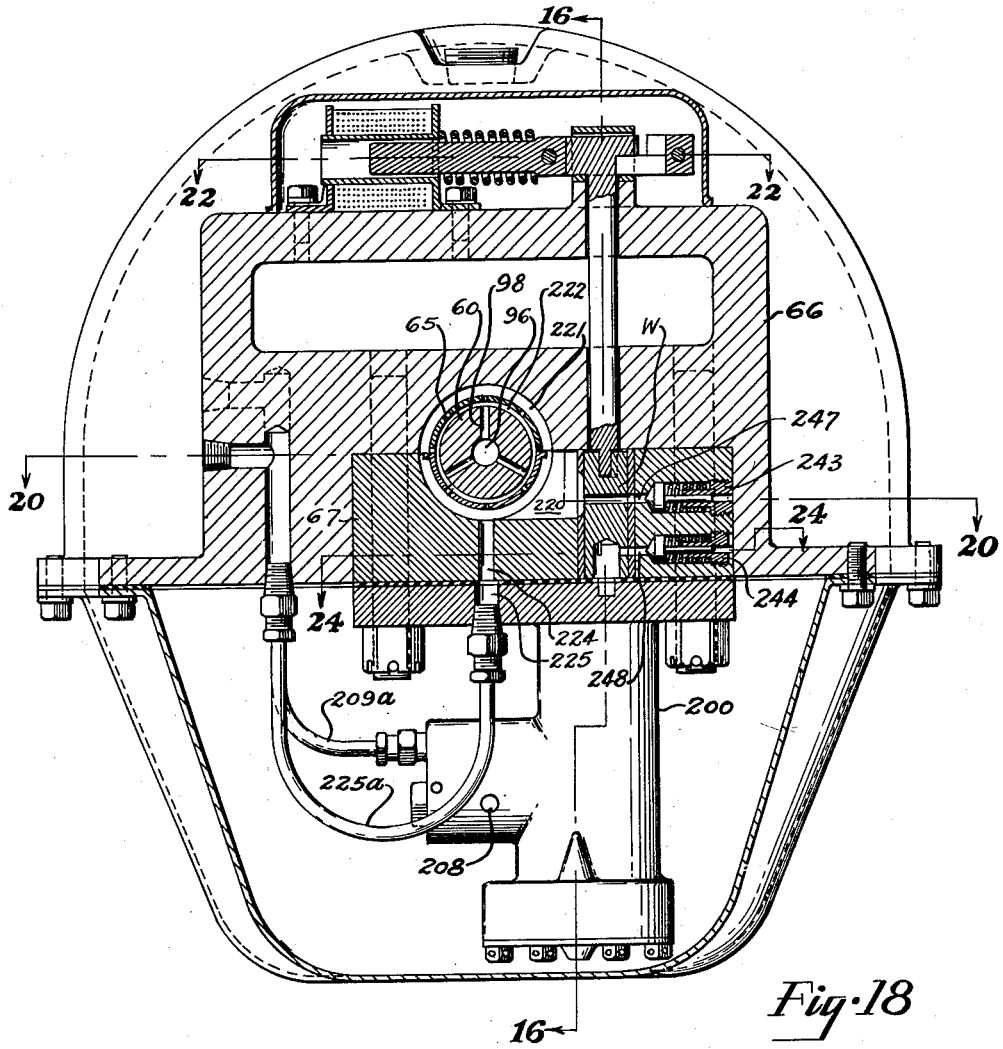
Figure 9:
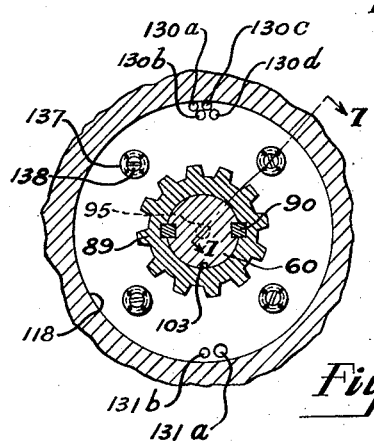
Figure 31:
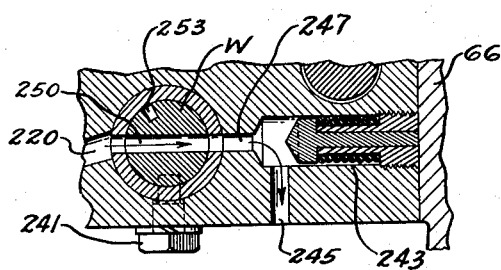
Figure 33:
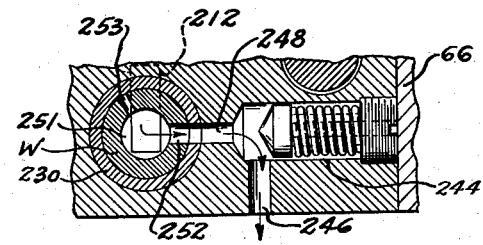
Figure 32:
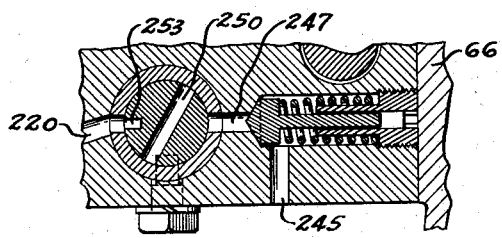
Figure 34:
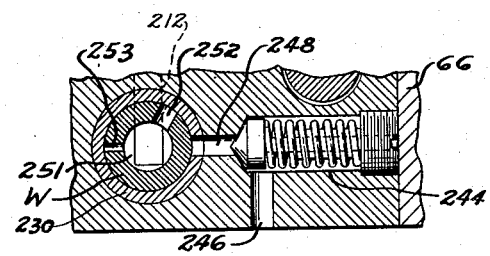
Figure 37:
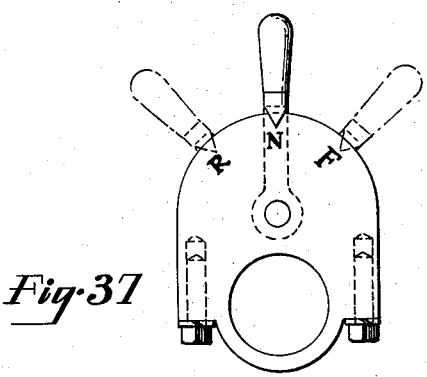
Figure 35:
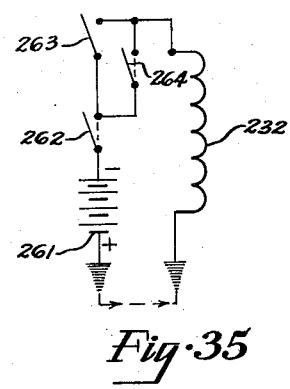
Figure 36:
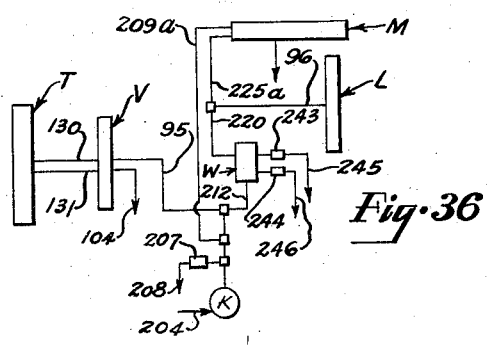
Figure 39:
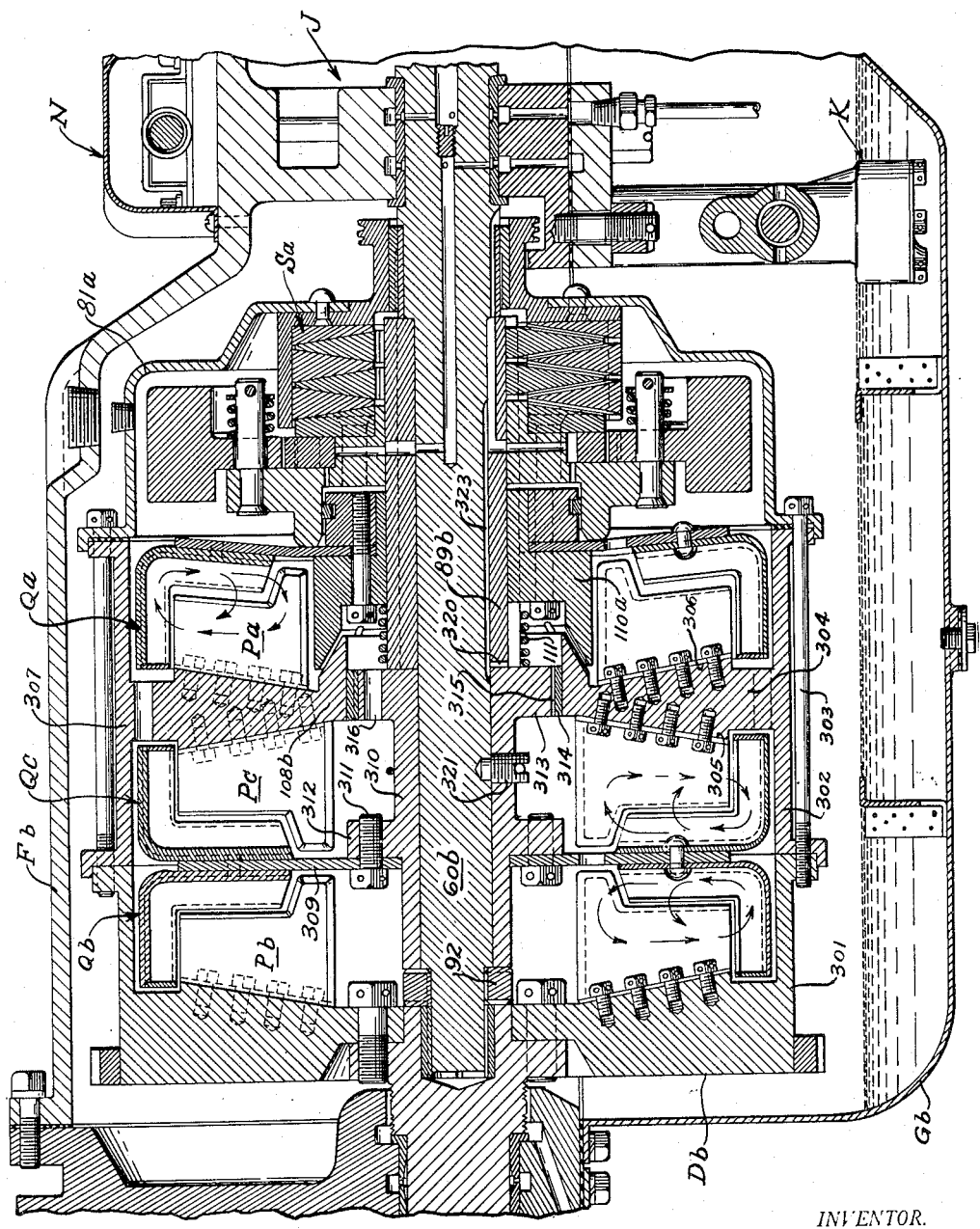

Fig. 8 is a transverse section taken substantially along the staggered line 8—8 in Fig. 1 through the speed responsive ring valve controlling the flow of hydraulic fluid to and from the hydraulic piston and cylinder assembly actuating the torque boosting clutch and direct drive clutch, the valve being shown in position cutting off the fluid supply ports to the hydraulic cylinder and leaving the fluid exhaust ports therefrom completely open;

Fig. 9 is a fragmentary section taken along the line 9—9 in Fig. 2 to show details of the inner face of the cylinder head of the torque boosting clutch and direct drive clutch operating hydraulic cylinder;

Fig. 10 is a fragmentary detail taken in section similar to Fig. 8 but showing the ring valve in a position opening some of the fluid inlet ports and closing off one of the fluid exhaust ports of the hydraulic cylinder;

Fig. 11 is similar to Fig. 10 but shows the valve in a further advanced position with one of the exhaust ports still completely open but more of the inlet ports exposed;

Fig. 12 is similar to Fig. 11 with the second fluid exhaust port partially closed and more of the fluid inlet ports open;

Fig. 13, similar to Fig. 12, shows the ring valve advanced to a position where the fluid exhaust ports are both completely closed and almost all the inlet ports are open;

Fig. 14 is similar to Fig. 8 but is taken along the line 14—14 in Fig. 2 and shows the ring valve and its operating weights in an extreme open position with exhaust ports completely closed and fluid inlet ports completely open;

Fig. 15 is a vertical section taken transverse to the main shaft along the line 15—15 in Fig. 1 to show the structure of the pump supplying hydraulic fluid pressure for the actuation of the various elements of the transmission system;

Fig. 16 is a vertical section through the automatic driving control valve and pump taken substantially along the line 16—16 in Fig. 18;

Fig. 17 is a section transverse to the main shaft taken along the line 17—17 in Fig. 1 to show the fluid feed channel system from the pump to the main shaft channel which leads to the ring valve to supply fluid operating the torque boosting clutch and direct drive clutch actuating hydraulic system;

Fig. 18 is a vertical section taken transverse to the main shaft along the line 18—18 in Fig. 1 to show the structure of the automatic driving control valve, the solenoid actuating unit therefor, and the fluid channel system for supplying fluid to the hydraulic safety driving clutch and to the automatic gear shifting system, the solenoid unit being shown in de-energized or "off" position, as when the motor is idling or stopped, with the driving control valve in corresponding position;

Fig. 19 is a sectional view similar to Fig. 18, but taken substantially along line 19—19 in Fig. 2 showing the solenoid unit in energized or "on" position, with the driving control valve in corresponding position as under driving conditions;

Fig. 20 is a horizontal sectional view taken along the staggered line 20—20 in Fig. 18 to show details of the automatic driving control valve, the driving control valve being in "off" position similar to that shown in Fig. 18;

Fig. 21 is similar to Fig. 20 with the driving control valve in "on" position corresponding to that of Fig. 19, for driving conditions;

Fig. 22 is a horizontal section taken along the line 22—22 in Fig. 18 to show the valve in "off" position;

Fig. 23, similar to Fig. 22, is taken along the line 23—23 in Fig. 19 to show the "on" position of the actuating solenoid;

Fig. 24 is a fragmentary sectional detail taken along the line 24—24 in Fig. 18 to show the setting of the driving control valve ports which are set to shunt the pump output through an adjacent check valve to the sump;

Fig. 25 is similar to Fig. 24 but taken along line 25—25 in Fig. 19 with the valve in "on" position corresponding to driving conditions;

Fig. 26 is an enlarged detail of Fig. 18 showing the driving control valve construction and position and the adjacent relief valves, the lower relief valve however being shown in its open position as under idling conditions;

Fig. 27 is similar to Fig. 26, but showing an enlarged detail of Fig. 19, which shows the driving control valve in "on" position corresponding to the energized state of the solenoid, for supplying fluid pressure to the various hydraulically operated units;

Fig. 28 is a fragmentary vertical section along the line 28—28 in Fig. 26 to show further the arrangement of the check valves in the fluid exhaust ports for the fluid system, which are associated with the driving control valve;

Fig. 29 is a fragmentary horizontal section through the driving control valve taken along the line 29—29 in Fig. 16 to show details of the valve stop and retaining structure;

Fig. 30 is similar to Fig. 29, but showing the valve in the opposite position;

Fig. 31 is a fragmentary detail of Fig. 20 enlarged to show details of the driving control valve in "off" position and its relation to the uppermost relief valve, which appears in open position;

Fig. 32, similar to Fig. 31, is an enlarged detail of Fig. 21, but showing the valve in the "on" or driving position;

Fig. 33 is an enlarged detail of Fig. 24 showing the relation of the driving control valve in "off" position to the lower of the two adjacent relief valves, which appears however in open position as under idling conditions;

Fig. 34, similar to Fig. 33, is an enlarged detail of Fig. 25 with the driving control valve in the "on" position;

Fig. 35 shows an electrical circuit controlling the actuating solenoid of the control valve;

Fig. 36 shows schematically the hydraulic lines of the automatic transmission system and the relation of the various elements thereof;

Fig. 37 shows a driving selector lever to be manually operated by the operator in setting the transmission system for forward, reverse and neutral conditions;

Fig. 38 is a vertical axial section similar to Fig. 1, but showing a heavy duty form of the fluid coupling assembly and of the torque boosting clutch of this invention; and Fig. 39, similar to Fig. 38, shows the heavy duty torque booster clutch of Fig. 38 in combination with a multiple turbine and impeller type of fluid coupling assembly for very heavy duty service.

For convenience the present invention is shown in the drawings and herein described as applied to an automotive vehicle, although the invention is of course adaptable to other environments. The general relation of the elements comprising the automatic transmission is best shown in Fig. 1, wherein appear a portion of the rear of an automotive vehicle engine block A, the engine crank shaft B, the rear main shaft bearing C, the engine fly wheel D secured to the end of the crank shaft and provided with the usual starter ring gear E. A housing secured to the rear of the engine block, comprising an upper half F in the form of a casting and bolted thereto a lower half G of drawn sheet metal providing a hydraulic fluid pan or sump, encloses a fluid coupling unit H, an automatic driving control unit J, a fluid pump K and a hydraulically operated main or safety driving clutch L. An automatic hydraulically operated gear shift unit M is secured to the rear of the casting forming the upper part of the housing, and a solenoid type actuating unit N for the automatic driving control unit is mounted to the top of the housing.

The gear shift unit M, the specific structure of which forms no part of the present invention, includes a reverse gear train, low speed forward gear train, high speed forward gear train, hydraulic cylinders to shift the gear selectively, a hydraulic cylinder operated master control valve for selectively directing hydraulic fluid to the gear shifting cylinders, and means for automatically changing the application of the hydraulic fluid pressure to effect a shift from low to high at a preselected forward speed of the vehicle.

Within the fluid coupling unit casing are enclosed a fluid coupling assembly comprising a fluid impeller wheel P and a fluid driven runner or turbine wheel Q; a direct drive clutch R operable to provide a mechanical shunt past the coupling device for increased coupling efficiency under high speed driving conditions; a torque boosting clutch S; a hydraulic piston and cylinder assembly T for actuating the direct drive and torque boosting clutches; and a centrifugally operated speed responsive ring valve assembly V controlling the fluid operating the hydraulic assembly T.

The sump portion of the housing has a drainage aperture and plug 51, a filling over-flow aperture and plug 52 and perforated transverse baffles 53. A port provided with plug 54 on the top of the casing serves for initial filling of the fluid coupling unit H and the sump, but a service port 55 leading through the engine block to a convenient opening under the vehicle hood provides a channel for filling the sump in subsequent servicing. A main shaft 60 of the fluid coupling unit H (see Fig. 4) with its forward reduced end 61 journaled in a longitudinally interiorly grooved pilot bearing or bushing 62 pressed into the recess 63 in rear of the engine crank shaft and a rearward reduced portion 64 journaled in the split shell type bearing 65 mounted between the transverse web 66 of the housing casting F and a pillow block 67, supports at its rear end the casing of the main clutch L. In a similar manner, the driven shaft 70 of the clutch has a reduced forward end 71 journaled in a longitudinally interiorly grooved pilot bearing or bushing 72 pressed into the recess 73 of the main shaft 60 and a rear portion supported by a ball bearing assembly 74 in the casing 75 of the gear shift unit M. To prevent gear lubricant from leaking into the hydraulic fluid sump, an oil seal 76 is provided between the bearing 75 and the housing F.

Fluid coupling unit

The casing of the fluid coupling unit comprises two cylindrical shells 80, 81 bolted together along the fluid tight joint provided by their flanged peripheries between which a gasket is inserted, the forward half 80 being secured to the conforming rear face of the fly wheel D. The rear half 81 of the casing is rotatably mounted to the main shaft 60 by and secured to a flanged hub sleeve 82 having a bushing 83 pressed into its bore, a worm 84 cut at its outer end for driving the pump K as hereinafter described, and within the casing a flanged portion 85 to which the casing end wall is riveted. Rotatably alignable with opening 54 is a coupling unit filling aperture and plug 86. The inner surface of bushing 83 is longitudinally grooved from the inner end part way toward the outer end to provide grooves distributing the hydraulic oil for lubrication purposes. Similar grooves in the bushings, or bearings clutch faces or similar surfaces which are described herein serve a like purpose.

The structure of the main shaft 60, particularly the portion mounting the fluid coupling unit H, may be clearly seen from the axial sectional views appearing in Figs. 1, 4 and 20; and in the transverse sectional views of Figs. 3, 6, 8, 9, 17 and 18. Preferably the portion of the shaft surface supporting the casing hub sleeve 82 has shrink-fitted thereover a steel sleeve 88, providing a bearing surface for the bushing 83. A splined sleeve 89 keyed to the shaft by keys 90 is disposed between the reduced end 61 and the sleeve 88, being held axially by the flanged round nut 91 threaded to the shaft 60. A rivet expanded in, or a screw threaded into an aperture in nut 91 and projecting into a spline groove locks the nut against rotation. A spacing and thrust bearing 92 with radially grooved end faces is interposed on the shaft end 61 between the end of crankshaft B and the nut 91.

An axial bore in shaft 60 running from the end recess 73 is divided by a plug 94 into two channels 95, 96 into which fluid under pressure may be introduced through radial channels 97, 98 opening through the reduced portion 64, to feed through radial channel 99 to the ring valve assembly V and through recess 73 to clutch L respectively as hereinafter described. In the spline sleeve 89 a radial channel 100 is aligned with shaft channel 99, while on the opposite side a radial channel 101 is intersected by a rearwardly extending groove 102 on the inner spline sleeve surface. By the provision of grooves 103 and 104 in the main shaft underlying the spline sleeve 89 and the bearing sleeve 88, the radial channel 101 opens respectively interiorly and exteriorly of fluid coupling unit H. The radial grooves in spacer 92, and the longitudinal grooves 103, 102, 104 of the shaft 60 and sleeves 88 and 89 provide a channel from the casing interior to the exterior through which residual air may be expelled upon operation after the initial filling.

Figure 3:
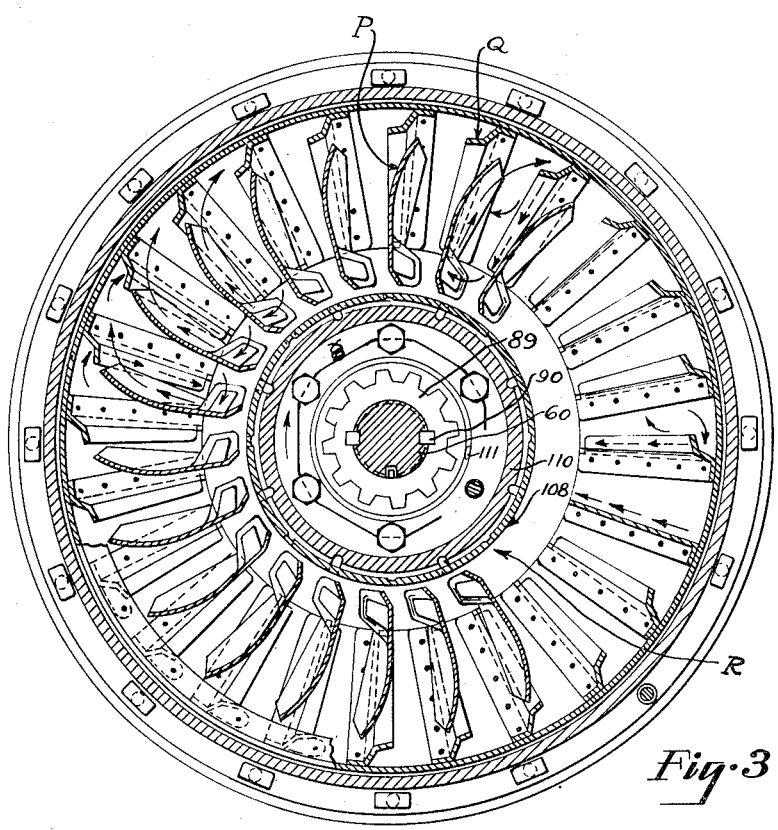
Fig. 3 is a vertical transverse sectional view toward the rear taken substantially along the line 3—3 in Fig. 1 through the fluid coupling unit and the direct drive clutch associated therewith.
Figure 5:
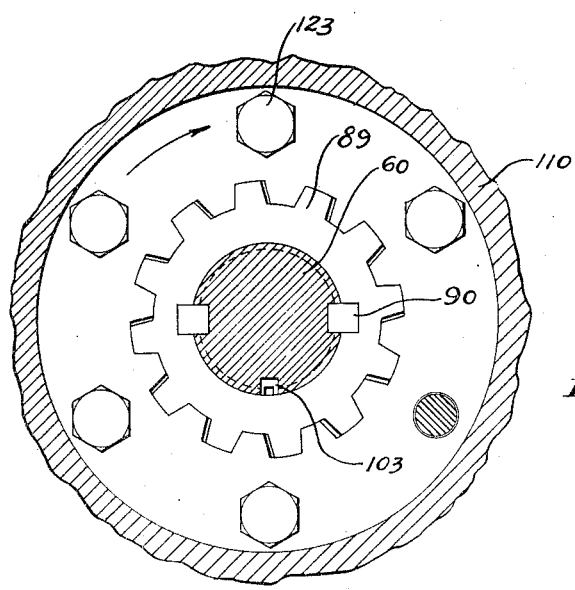
Fig. 5 is a detailed fragmentary view of the central portion of Fig. 3 exaggerating the clearance between splines of the axially movable male member of the direct drive clutch and the splines of its supporting spline collar.

The direct drive cone clutch mechanism R, best seen in Figs. 1, 3 and 5 comprises the female cone clutch member 108, secured to the end wall of casing member 80 coaxially of the end of crankshaft B by bolts 109 passed through the female member, the forward wall of casing member 80, and the fly wheel D into the end flange of the crankshaft; a spined cone member 110 slidably mounted by splined sleeve 89 to the main shaft 60; and a compression spring 111 interposed between the male clutch member and the flanged nut 91 to hold the clutch members out of engagement. The cone faces of the members are laterally grooved to provide hydraulic fluid lubrication preventing scoring, and a vent hole 112 is provided in the female member to prevent entrapment of hydraulic fluid in the clutch. As appears by the exaggerated showing of Fig. 5, a slight circumferential freedom is provided between the lands of the male clutch splining and the lands of the spline sleeve 89, so that the male member 110 will slide freely on the spline sleeve when torque is not being transmitted therethrough to shaft 60.

The fluid coupling assembly comprises the impeller or fluid projector wheel P secured coaxially of the clutch to the end wall of casing member 80 by bolts 114 passed therethrough into fly wheel D; and the driven runner or turbine wheel Q carried on the male clutch member 110. The structure and operation of the bladed impeller P and turbine wheel Q preferably are such as that disclosed in various forms by my co-pending application Serial No. 272,030 and hence is not here described in detail. The structure, however, is clearly apparent in Figs. 1 and 3. Whatever the form of coupling assembly, whether such as described in the said applications or patent, the structure will be such as will allow a slight relative axial shifting of the turbine relative to the impeller when the male clutch member is shifted into and out of engagement with the female member.

The hydraulic actuating unit T for the direct drive clutch R and torque booster clutch S comprises a piston member 117 carried by the male cone clutch member 110 and a short cylinder formation 118 on the forward face of the disk-like member 119, which serves also as a base for the ring valve assembly V and for a movable member of clutch S. The piston member 117, of annular form and provided with a piston ring or packing 120 in its circumferential groove, is disposed about the cylindrical rearward extension 121 of male clutch member 110. The turbine blade mounting disk 122 of turbine wheel Q is similarly disposed on extension 121, so that bolts 123 passed through the male clutch member and turbine disk into the piston member secure these elements together as an axially shiftable unit. The channel system 102, 103, 104 permits fluid flow from the casing 80, 81 as needed upon operating expansion of the assembly T and also to vent fluid leaking around piston 117. Upon return of piston 117 under force of spring 111, fluid leaks by piston 117 into the casing and some may be admitted to the casing through cylinder exhaust channel 135 and channels 101 and 103.

Figure 7:
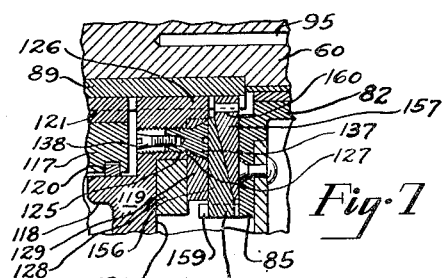
Fig. 7 is a fragmentary radial sectional view taken along the line 7—7 appearing in Fig. 9 to show more clearly the manner of splining and securing of the various members of the torque boosting clutch.

The structure of the ring valve assembly V is represented by Figs. 1, and 8–14. The rear face of the splined base member 119, which is axially shiftably mounted to shaft 60 by the spline sleeve 89, is successively reduced in diameter to provide short cylindrical portions 125, 126 separated by a shoulder or radial face 127, about which respectively are disposed the rotatable valve ring member 128 and the annular axially movable forward friction plate 129 of the torque boosting clutch S. The diameter of the valve ring mounting cylindrical portion 125 is somewhat smaller than the bore of the hydraulic cylinder 118 so that a group of cylinder inlet ports 130 a–d and, spaced about 180° therefrom, a group of cylinder exhaust ports 131 a–b of unequal area may be bored through the cylinder head to the rear face 132 of member 119 adjacent the perimeter of cylindrical portion 125. Radial inlet and exhaust channels 134, 135 opening outwardly to the face of cylindrical portion 125 respectively near the inlet ports 130 and exhaust ports 131, are of such size and are so disposed that the inner ends thereof are substantially aligned with the spline sleeve channels 100 and 101 despite operative axial shifting of member 119. The valve ring member 128 is retained on cylindrical portion 125 by the overlapping outer edge of the annular clutch plate 129. The detail of Fig. 7 shows clearly the manner in which plate 129 is secured against the face or shoulder 127 of base member 119 by the large split end screw 137 threaded into the base member and locked therein by a small expender screw 138.

The speed responsive ring valve actuating means of the ring valve assembly V is best seen in Fig. 8. The ring valve member 128 is provided on its inner circumference with two approximately diametrically disposed slots 140, 141 which, when rotated to proper position put the radial inlet and outlet channels 100, 101 in communication respectively with the cylinder inlet and exhaust ports 130, 131. Four spaced centrifugally moved weights 142, mounted on pivot pins 143, projecting from the rear face of the base member rim and biased inwardly by springs 144, are provided with teeth 145 meshing with the tooth formations 146 on the ring member 128, so that as the weights move in response to rotational speed changes of the base member 119, rotating simultaneously with shaft 60, the position of the ring valve member 128 is changed to control fluid entering and leaving the clutch actuating hydraulic assembly T and hence to control the clutch operating pressure. Stops 148 are provided on the circumference of base member 119 to engage the weight stop lugs 149 and so limit the outward weight swing. To limit the rotation of the ring member directly a pin 150 extending from the base member 119 engages the shoulders 151, 152 of the recess 153 formed on the circumference of the ring member 128.

The torque boosting clutch assembly S (see Figs. 1, 6 and 7) comprises the annular friction plate 129 on the shiftable base member 119 as an axially movable member controlling clutch operation; the inner face of the flange 85 on sleeve 82 as an axially fixed friction plate member; and the intermediate plates 156 and 157 having male and female, i. e. complementary, adjacent conical faces and flat faces disposed toward the flat plate 129 and flat flange plate 85. The several plate faces are radially grooved to permit access of fluid as a lubricant preventing scoring during slip. The male plate 157 is splined to shaft 60 through spline sleeve 89, similarly to the male clutch member 110 and base member 119, with which it is therefore simultaneously rotated. The female plate 156 is in effect exteriorly splined to the plate 85 by the radial lugs 158 engaged between the forwardly projecting lugs 159 on the outer edge of the plate 85, as may be seen in Fig. 6. The operating space of clutch S is vented through apertures 160 provided in plate 157 and through the radial friction plate grooves. The friction faces in contact in the clutch should be of different hardness, and thus members 85 and 156 may be soft steel or bronze and members 157 and 129 hard steel.

The above described fluid coupling unit has the following sequence of functions leading to full speed driving conditions. When the engine is idling the direct drive and torque boosting clutches transmit no power for the compression spring keeps clutch member 110 disengaged from member 108 in clutch R; and through the several members of booster clutch S are in contact due to the force of spring 111 transmitted through the turbine disk bearing on the end of cylinder 118, the contact pressure is insufficient to effect any appreciable torque transmission to the shaft 60 from the casing 80, 81, rotating with the fly wheel. Fig. 1 shows the position of the elements under such idling conditions. As the engine speed increases, fluid is projected from the blades of the fluid coupling impeller wheel P into the turbine blades of turbine wheel Q, thereby developing torque applied to the main shaft 60 through member 110 splined to spline sleeve 89. The transmission of torque from the splines of the turbine carrying member 110 to sleeve 89 develops a force normal to the torque transmitting spline faces, thereby developing a corresponding frictional force resisting axial sliding of member 110 on sleeve 89 additive to the force of spring 111. As the main shaft 60 picks up speed, the centrifugal weights move outwardly, rotating the ring valve member 128 from idling position of Fig. 8 through the sequence of positions of Figs. 10, 11, 12 and 13 to the extreme or full driving position of Fig. 14.

The result of the change in valve position is that fluid supplied from the pump K to main shaft channel 95, as hereinafter described, and hence through the radial channels 99, 100 to the radial channel 134 in member 119, is admitted to the cylinder 118 in increasing amounts through the successively opened inlet ports 130 a–d. At the same time the cylinder exhaust ports 131 a–b are gradually closed off, throttling and finally cutting off completely the outward or exhaust flow of fluid from the cylinder 118, through the radial exhaust channels 135 and 101, in the base member 119 and spline sleeve 89, to channels 102 and 104 which open adjacent the worm 84 exteriorly of the casing. In consequence an increasing hydrostatic pressure is built up in the hydraulic actuating unit T, the tendency of which to move the male clutch member 110 toward the female 108 in the direct drive clutch is resisted by the aforementioned frictional force, but which applies on through slidable member 119 to the torque boosting clutch assembly S. Hence, as the axially directed force increases, slippage between the members of the torque boosting clutch decreases with increasing frictional force, and an increasing torque is supplied to shaft 60 through clutch S in parallel to that developed by impeller P and turbine Q. With increasing torque transmission through clutch S, torque transmission through impeller P and turbine Q decreases. The result is that the force of compression spring 111 and the said frictional force holds the male clutch member 110 out of direct drive engagement, until the torque boosting variable slip clutch S is transmitting such torque as decreases the torque transmitted through turbine Q, and hence the frictional force to such a degree that the pressure built up in the actuating unit T causes engagement of the direct drive clutch R for direct connection of engine crank shaft B to the main shaft 60 as shown in Fig. 2. A smooth continuous acceleration of the vehicle is thus obtained with high coupling efficiency. The selected speed at which the clutch S becomes operative and the rate of increase of torque boosting effect is of course dependent upon the relative positioning and area of inlet and exhaust ports 130 and 131, leakage allowed about piston 117, strength of spring 111, centrifugal weight and spring design, the pressure of the fluid in channel 95 and other such design factors. The selected speed at which the direct drive clutch becomes engaged is determined by similar design factors. The reverse sequence of operations occurs during deceleration.

*Main clutch unit L*

The main or safety clutch L, the structure of which is disclosed in co-pending applications 272,030 and 190,992, comprises a movable male cone clutch member 170 splined to the driven clutch shaft 70 for axial movement thereon; a clutch spring 171 interposed between member 170 and a collar 172 butting against the driven clutch shaft shoulder 173; a female cone clutch member 174 forming the rear part of the clutch casing; a cylindrical forward casing member 175 secured to member 174 by bolts 176 along the circumferential casing member flanges, and having a hub portion 177 on the forward end wall 178 thereof secured to the end of shaft 60 by set screws 179 (Fig. 1) and keys 180 (Fig. 2); and an annular piston member 181 movable within the cylindrical forward casing member and disposed about the forward central extensions 182 on the male clutch member 170. Guide pins 183 extending from the forward casing wall project into guide apertures 184 of a piston member and prevent the latter from rotating relative to the forward casing member. Collars or washers 185 on the guide pins space the piston member in disengaged position from the forward casing wall which is the cylinder head of the hydraulic piston and cylinder assembly of the clutch. The piston member has packing or a piston ring 186 disposed in its peripheral groove and has the rear face recessed at 187 to leave a rim portion 188 bearing on the forward face of the movable clutch member. Longitudinal grooves 189 on the inner periphery of the piston allow hydraulic fluid to pass to the recessed face and hence provide lubrication between the movable clutch member and the piston. The forward end of the clutch shaft 70 has a central bore 190 extending back to intersect the radial channels 191 to admit hydraulic fluid supplied under pressure to recess 73 of the main shaft, as hereinafter described, to the space between the piston and the casing for actuating the clutch.

*Pump and automatic driving control unit*

The general relation of the automatic driving control unit J, the solenoid actuating unit N therefor, the pump K and the fluid channels for introducing hydraulic fluid to the channels 95 and 96 in the main shaft may be seen in Figs. 15, 16, 17, 18 and 20. In Fig. 15 the pump K appears as a gear pump having its casing 200 bolted, and by a suitable gasket, sealed, to the bottom of the pillow block structure 67 with its vertical shaft 201 driven through the worm gear 202 by the worm 84 at the rear of the fluid coupling unit casing. Hence the pump is continuously driven as long as the engine is running. A semi-circular trough formation 67a on the forward portion of the pillow block 67 holds hydraulic fluid, exhausted through the channel 104 or seeping between the bearing 83 and the shaft sleeve 88, for lubrication of the worm and worm gear. Fluid drawn in through the pump inlet 204 is delivered through channel 205 into the reservoir or chamber 206 about shaft 201 within the pump casing. A spring biased pressure relief valve 207 allows fluid to be released from the pump through the relief port 208 to return to the sump when the reservoir pressure exceeds say 10 p. s. i. for a passenger car. The outlet channel 209 in the pump casing supplies fluid under full reservoir pressure to line 209a to power the gear shifting cylinders in the automatic gear shifting mechanism M as hereinafter described. A channel 210 cut in the top surface of the pump base opens to similarly formed channels 211 and 212.

The channel 211 extends to a vertical channel 214 in the pillow block opening into a circular groove 215, formed in the pillow block and the transverse web 66 about the shell bearing 65 of the main shaft 60. The interior surface of the bearing 65 has a circumferential groove 216 coincident with the radian channels 97 of the main shaft and a plurality of apertures 217 to connect the circular channels 216 and 215, as may be seen in Fig. 17. Thus through the described channel system fluid may be supplied from the pump reservoir 206 at reservoir pressure to the central channel 95 of the main shaft leading to the ring valve V as previously described.

As may be seen from Figs. 18 and 19, there is provided a similar channel system for admitting fluids to the central channel 96 of the main shaft 60 for main clutch actuation. A channel 220 cut in the top of the pillow block 67 to which fluid may be selectively admitted by the driving control valve member V from the pump channel 212, opens into a circular channel 221 cut in the pillow block and transverse web 66 about the bearing 65, which is provided with a second circumferential channel 222 on its inner surface in alignment with the radial channels 98 in the main shaft and a plurality of apertures 223 opening from the channel 222 through the bearing to channel 221. A vertical channel 224 extends downwardly from the intersection of the channels 220 and 221 through the pillow block to open into a corresponding registered channel 225 opening through the bottom of the pump base for supplying fluid to line 225a for actuating a hydraulic cylinder setting a master control valve of the automatic hydraulically operated gear shift unit M.

The automatic driving control unit comprises the valve member W rotatable in the valve sleeve 230 fitted in a vertical bore in the pillow block by means of the vertical shaft 231, and the solenoidal actuating unit N for rotating the member W to its two settings. To facilitate the assembly of the mechanism, the shaft 231, journaled in transverse web 66, is separate from the valve member W with which it is in tongue and groove engagement.

The structure of the actuating unit N is shown clearly by the horizontal sections in Figs. 22 and 23 with solenoid off or deenergized and on or energized, respectively, comprising the solenoid 232, the armature bar 233 provided with a yoke 234 slidable in the bracket member 235 and carrying the pin 236 eccentrically engaged in the radial slot 237 in the head 238 of the shaft 231, and a biasing return spring 239. When the solenoid is "off" or deenergized the compression spring 239 returns the armature and yoke to the position of Fig. 22, thereby moving the valve to a setting shown in Figs. 18, 20, 24, 26, 29, 31 and 33. When "on" or energized, the solenoid moves the armature to the position shown in Fig. 23, and so moves the valve to its opposite setting in the position shown by the Figs. 19, 21, 25, 27, 30, 32 and 34.

A screw 241 threaded into the pillow block 67 projects through the valve insert 230 into the slot 242 in the side of the valve member W, providing both means for holding the insert 230 and a stop for the valve rotation to determine the two opposite valve settings mentioned above (Figs. 29, 30). In the pillow block adjacent the valve member W there are two lightly spring loaded check valves 243 and 244 which permit relief of fluid pressure from the various hydraulic elements, as hereinafter described, to the fluid pan or sump G through the exhaust ports 245 and 246 while maintaining the lines and channels full of fluid without admission of air thereto.

The upper valve 243 has a channel 247 leading through the valve sleeve insert to the valve member W and the lower valve 244 a similar channel 248. A diametric passage 250 is positioned in member W to register with the channels 220 and 247 in the pillow block (Fig. 31) to put the hydraulic lines of the clutch unit L and hydraulic control line 225a of the gear shift unit in communication with the exhaust port 245 when the solenoid goes off, the valve 243 opening momentarily (Figs. 20, 31) to discharge fluid from clutch L and to release pressure in line 225a, and then closing (Fig. 26). When the solenoid is on passage 250 moves out of such register (Fig. 32). The bottom of the valve member is provided with a recess 251 in register with the channel or groove 212 in the top of the pump base to receive fluid from the pump K, and also a lateral aperture 252 opening into the recess 251 and disposed parallel to passage 250 to register with the channel 248 for allowing hydraulic gear shift power line 209a and the pump K to discharge to the sump through valve 244 and the exhaust port 246 when the solenoid is off, but the engine running (Figs. 26, 28, 33). When the engine, and hence pump K, are not running, the valve 244 closes to prevent entrance of air to the lines (Figs. 18, 24). A longitudinal lateral slot 253 opening to the recess 251 is cut in W at the position such that when the solenoid is on and W set accordingly (Figs. 19, 20, 27, 32, 34) the fluid delivered by pump K to channel 212 passes through the valve member W to the channel 220, whence it can pass to the clutch L and gear shift unit hydraulic control line 225a. The general relation of the hydraulic lines and elements is shown schematically by Fig. 36 wherein the arrows indicate a discharge line to the sump.

To control the solenoid of the valve actuating unit N, the electrical circuit shown in Fig. 35 is provided comprising in series battery 261, main switch 262, a set of parallel switches 263 and 264, and the solenoid 232. The main switch 262 is mechanically linked to the driving control selector lever appearing in Fig. 37 in such fashion that, when the selector lever is set to neutral (N), the said switch is open but when the selector lever is set either to forward (F) or reverse position (R) it is closed. The driving control selector lever is also mechanically linked to the master control valve of gear shift unit M to set the valve to a neutral position, or to a forward low or reverse position, so that when the driving control valve is moved by the solenoid to "on" position, fluid in line 209a is directed to cylinders shifting the gears to low forward or reverse position.

The switch 263 is linked to the accelerator pedal so that with the selector lever of Fig. 37 set to a driving position, either forward or reverse, when the accelerator is depressed to speed up the motor, the solenoid is energized to set the valve member W to the "on" position shown in Fig. 19 and corresponding figures. The switch 264, independent of the accelerator and mounted conveniently for manipulation by the operator, is provided for use in energizing the solenoid to set valve W to "on" position when the braking effect of the vehicle engine is desired, for example in descent of hills, or for emergency use in the event of failure of the accelerator switch.

When the valve member W is at "on" position, fluid is delivered from the pump through channel 212, the valve and channel 220 to supply fluid through line 96 to close the main driving clutch L, with a slight lag due to clutch leakage, to allow gear shift. At the same time, fluid pressure is admitted through the line 225a to a hydraulic actuating cylinder of the master control valve in unit M to be available for moving the master control valve to direct fluid pressure in line 209a to a hydraulic cylinder in M shifting the gears to high forward position and cutting off fluid pressure to the low gear cylinder to permit low gear disengagement when the vehicle reaches a preselected speed. Simultaneously, pressure is built up in the pump reservoir and delivered through channel 211 and 214, supplying pressure through the channel 95 and speed responsive ring valve to the fluid coupling unit and also through the channel 209 and line 209a to supply the motive pressure effecting the gear shifting.

Thus, as soon as the accelerator pedal is depressed the gears are automatically shifted corresponding to the setting of the control lever in Fig. 37; the main driving clutch is then engaged; and as the engine accelerates the fluid coupling unit may proceed through the previously described sequence of operations up to a direct engagement between the fly wheel and the shaft 60 effected through the direct drive clutch R. When the vehicle reaches a predetermined forward speed, speed responsive means in unit M causes pressure in line 225a to move the master control valve in M for changing the gear setting from low to high.

When the accelerator pedal is released and the switch 263 opens, the solenoid is de-energized and the valve member W returned by the force of the compression spring 239 to the position shown in Figs. 20, 26, 31 thereby opening the channel 212 to the channel 248 so that the fluid delivered by the pump is discharged to the sump through valve 244 and the exhaust port 246 during the time that the engine is idling so that the pump reservoir pressure nears zero. Since the channel 95 is ultimately in communication with the channel 212, this setting also allows a release of the fluid pressure in the hydraulic assembly T, even before the ring valve D returns to cylinder exhaust position. At the same time, with this same idling setting of the valve member W, the channel 220 is put in communication by passage 250 with the channel 248 to allow fluids to pass through the valve 243 and exhaust port 245 to the sump, thereby releasing the fluid pressure in the gear shift control valve line 225a, causing an immediate shift in the master control valve setting from high to low, and also in the line 96 to allow the clutch L to disengage for free-wheeling when the vehicle is moving, and to eliminate creeping when the vehicle is standing with motor idling and the drive selector lever set at forward or reverse.

Though the accelerator is depressed and switch 263 closed, so that pressure is on in lines 209a and 225a, if the vehicle slows down sufficiently, the speed responsive means in M causes a change of the master control valve setting back to low forward position so that gear shifting from high to low is effected.

*Heavy duty modifications*

For heavy automobiles, trucks and like service, a modified form of the invention is advantageously used, generally similar to the structures previously described in Figs. 1 to 37, but having forms of turbine and impeller wheels and torque boosting clutch adapted for such heavy duty service. Such form is shown in Fig. 38, wherein appears only the fluid coupling unit Ha. This unit alone is described, since significant changes from the previous structures have been made only in the impeller and turbine wheels Pa, Qa and in the torque boosting clutch Sa, the other changes being primarily dimensional to accommodate these changes. In the Fig. 38 like numerals are used for parts like to those previously described.

The impeller wheel Pa and turbine Qa are generally similar to the corresponding elements P and Q of Fig. 1, but have larger fluid flow areas and blade areas for the transmission of greater torque loads. Such heavy duty modification is described in detail in the aforementioned co-pending application Serial No. 272,030. The male clutch member 110a is similar to 110 in Fig. 1 with the length increased to accommodate the increased size or axial length of the turbine and projector wheel assembly. The torque boosting clutch unit Sa is adapted for increased torque transmitting capacity by an increase in the number of friction plates. The flanged sleeve unit 82a is modified by increasing the length of the forwardly projecting lugs 159a disposed about the perimeter of the radial flange 85a to accommodate the increased number of clutch friction plates 156a, 156b and 156c, which are each provided with peripherally spaced lugs 158a to allow what is in effect a splined engagement between the lugs 159a of the flange 85a. Two like plates 157a and 157b, each having opposite male cone faces, are splined for axial movement to the spline collar 89a and are interposed respectively betwen the plates 156a, 156b and between 156b and 156c. As described for clutch S in Fig. 1, the friction plates are of diverse hardness, for example members 129a, 157a, 157b are hard steel, while members 156a, b, c may be bronze or soft steel.

It is to be noted that the flange 85a does not here serve as a friction plate, but the plate 156a, with flat rear face against 85a and forward female conical face, has the function of the end friction plate served by flange 85 in Fig. 1. The plates 156b and 156c are of identical form, each having opposite female conical faces complementary in shape to the faces of the plates 157a and 157b. The forward friction plate 129a, carried on the base member 119, has its rear face accordingly modified to provide a male cone surface. Of course, the housing members Fa and Ga, the fluid coupling unit casing members 80a and 80b are modified to accommodate the changed dimensions of the turbine wheel, impeller wheel and torque bosting clutch. Similarly, the spline sleeve 39a and shaft 60a are increased in length to accommodate these structures.

In Fig. 39 there is shown an adaptation of the invention to very heavy duty service for use with diesel engines, or in locomotive units, heavy buses and trucks. The torque boosting clutch Sa, turbine wheel Qa and impeller wheel Pa are similar to those previously described for Fig. 38 and hence will not be here described in detail. The primary change, however, is the provision of an additional fluid coupling assembly comprising dual driving turbine and projector wheels which act in parallel with the fluid coupling assembly Pa and Qa. The fly wheel Db with the laterally projecting flange 301, the rear casing shell 81a and interposed cylindrical casting member 302 are secured in axial alignment along the two circumferential gasketed flanged joints by bolts 303 extending from 81a to 301 exteriorly of the casting 302 to provide the fluid coupling unit housing. Integral with the cylindrical member 302 and near the mid-length thereof is provided a centrally apertured wall 304 having opposite faces 305 and 306 of female coned shape. To the rear face 306 the fluid projector wheel Pa is bolted. The axially fixed clutch member 108b for the direct drive clutch R is provided by a rearwardly extending circumferential flange formed with a male conical surface about the central aperture of the wall 304, while the movable member 110b has a female surface. A series of circumferentially spaced fluid passages 307 are provided through the wall 304 adjacent the cylindrical shell 302. The shaft 60b extends through the central aperture of the wall 304 and is journaled, as previously described for shaft 60 in Fig. 1, in the rear end of the crankshaft B.

On the rear face of the fly wheel Db and the forward face 305 of wall 304 are disposed a pair of similar fluid projector wheels Pb and Pc respectively, between which a dual turbine unit, comprising a pair of oppositely extending turbine wheels Qb and Qc, supported by disc 309, is mounted for rotation with shaft 60b on a sleeve 310 by means of the bolts 311 passed through the disc 309 into the flange 312 of the sleeve, the sleeve 310 being secured to shaft 60b by set screw 321. An enlarged rear portion 313 on sleeve 310 is journaled in the bushing 314, press fitted into the aperture of the wall 304. Longitudinal grooves 315 are provided on the inner face of the bushing for lubrication purposes and a series of circumferentially spaced fluid passages 316 extend through the end portion 313. The rear face of the sleeve 310 butts against the spline collar 89b, serving to hold the latter in axial position, and has therefore the function of the round flanged nut 91 of Figs. 1 and 4. The compression spring 111 of the direct drive clutch is therefore interposed between the end of the sleeve 310 and movable clutch member 110b of clutch R. The end of the spline 89b, adjacent to the sleeve 310, is provided with radial grooves for lubrication purposes and also a venting groove 320 in register with the longitudinal channel groove 323 analagous to the channel 103 in Fig. 1. The forward end of the shaft and sleeve assembly 60b, 310 is spaced from the rear end of the crank shaft by the spacing and thrust bearing 92.

In operation, the structure of Fig. 39 is essentially similar to that of the previously described units. Rotation of the fly wheel Db simultaneously rotates the impeller wheels Pa, Pb and Pc to effect a fluid coupling simultaneously through the turbine wheels Qa, Qb and Qc, which rotate as a unit with shaft 60b. The modified structure effects no essential structural or operational change, therefore, but does provide for an increased fluid torque transmitting capacity, and increased torque boosting clutch capacity.

I claim:

1. In a fluid transmission, a driving shaft and a bladed impeller thereon, a driven shaft and a bladed runner slidably splined thereto, opposed clutch members on said driving shaft and said runner, said impeller forming with said shafts a housing, hub means slideable keyed on said driven shaft within said housing, piston and cylinder means between said hub means and said runner for moving the latter toward said impeller, said clutch members being in driving engagement with said runner moved toward said impeller, a ring valve rotatably mounted on said hub means, centrifugal weight means mounted on said hub and connected for rotating said ring valve, a liquid pump driven by said driving shaft, and liquid passageway means in said transmission for connecting said piston and cylinder means to said pump and to a by-pass passage leading to said housing, said valve means being arranged to block the first-named connection and make the second-named connection at a low speed and to block the second-named connection and make the first-named connection at a predetermined higher speed.

2. In a fluid transmission, a driving shaft and a bladed impeller thereon, a driven shaft and a bladed runner slidably splined thereto, opposed direct drive clutch means on said driving shaft and said runner, said impeller forming with said shafts a housing, hub means slidably mounted on and keyed to said driven shaft within said housing, opposed torque boosting slip clutch means on said hub and said housing, piston and cylinder means between said hub means and said runner for moving the latter toward said impeller and urging the former toward the associated well of said housing, said clutch means being moved into driving engagement by fluid under pressure introduced into said cylinder means, means located between said driven shaft and the first said clutch means whereby the first said clutch means is restrained from engagement until a predetermined output shaft speed is attained for sequential operation of said clutch means, a ring valve mounted on said hub means, rotatable weight means mounted on said hub means and connected for rotating said ring valve, a liquid pump driven by said driving shaft, and liquid passageway means in said transmission for connection of said piston and cylinder means firstly to said pump and secondly to a by-pass passage leading to said housing, said ring valve being arranged to block the first-named connection and make the second-named connection at a low speed and to block the second-named connection and make the first-named connection at a predetermined higher speed, said direct drive clutch means being adapted for non-slipping engagement in sequential operation relatively to the slip clutch means.

3. In a fluid transmission, a driving shaft and a bladed impeller thereon, an intermediate driven shaft and a bladed runner slidably splined thereto, first opposed clutch means on said driving shaft and said runner, hub means on said driven shaft, piston and cylinder means between said hub means and said runner for moving the latter toward said impeller, said clutch means making driving engagement with said runner when moved toward said impeller, speed responsive valve means on said intermediate driven shaft, a liquid pump driven by said driving shaft, liquid passageway means including a by-pass in said transmission for first connecting said piston and cylinder means to said pump and secondly to the by-pass passage, said valve means being arranged to make the second connection at a low speed and to make the first connection at a predetermined higher speed, an output shaft, second opposed clutch means on said intermediate and output shaft, piston and cylinder means for engaging said second clutch means, and means for manually controlling the last said piston and cylinder means.

4. In a fluid transmission, a driving shaft and a bladed impeller thereon, an intermediate driven shaft and a bladed runner slidably splined thereto, first opposed clutch means on said driving shaft and said runner, hub means on said driven shaft, first piston and cylinder means between said hub means and said runner for moving the latter toward said impeller, said clutch means making driving engagement with said runner moved toward said impeller, speed responsive valve means on said intermediate driven shaft, a liquid pump driven by said driving shaft, and liquid passageway means including a by-pass passage in said transmission for connecting said piston and cylinder means firstly to said pump and secondly to the by-pass passage, said valve means being arranged to make the second-named connection at a low speed and to make the first-named connection at a predetermined higher speed, an output shaft, second opposed clutch means on said intermediate driven and output shafts, second piston and cylinder means for engaging said second clutch means, passageway means leading from said pump to said second piston and cylinder means, and a solenoid-controlled valve for said latter passageway means for directing fluid from said pump to said second piston and cylinder means.

5. In an automatic fluid operated transmission system, a fluid coupling unit comprising a torque input shaft, a torque output shaft, a fluid impeller on the input shaft, a turbine on the output shaft driven by fluid from said impeller, a casing enclosing said impeller and turbine, a direct drive clutch comprising a clutch member on said input shaft, a second clutch member on said output shaft, one of said clutch members being movable relative to the other for engagement therewith, means interposed between such clutch members normally biasing them out of engagement, and speed responsive means on the output shaft responsive to the speed thereof for effecting an engagement of said members at a predetermined speed of said driven member, said speed responsive means comprising a hydraulic piston and cylinder assembly disposed about said output shaft in said casing and linked to the movable direct drive clutch member whereby said movable member is moved into engagement at a predetermined speed upon application of fluid pressure within said assembly, a fluid channel system for introducing fluid pressure through the said output shaft to said assembly, and a centrifugal weight operated valve controlling the flow of fluid from said channel system to said assembly.

6. In an automatic fluid operated transmission system, a fluid coupling unit comprising a torque input shaft, a driven torque output shaft, a fluid impeller on said input shaft and a fluid driven turbine on said output shaft, a casing enclosing said impeller and said turbine, a torque boosting slip clutch comprising a clutch plate secured against rotation relative to said torque input shaft, a second clutch plate driven by said torque output shaft, speed responsive means linked to the output shaft for applying varying pressure between the two said clutch plates for effecting with increasing output shaft speed an increasing torque transmission through said clutch parallel to the transmission of torque by said impeller and turbine assembly, said speed responsive means comprising a hydraulic piston and cylinder assembly disposed about said torque output shaft and adapted to apply pressure to said torque boosting slip clutch members upon admission of hydraulic pressure thereto, a channel system in said output shaft for introducing hydraulic fluid to said assembly and a speed responsive valving means carried on said output shaft for controlling the flow of hydraulic fluid to said hydraulic assembly.

7. In an automatic fluid operated transmission system, a fluid coupling unit comprising a torque input shaft, a driven torque output shaft, a fluid impeller on said input shaft and a fluid driven turbine on said output shaft, a casing enclosing said impeller and said turbine, a torque boosting slip clutch comprising a clutch element secured against rotation relative to said torque input shaft, a second clutch element carried by said torque output shaft, speed responsive means linked to the output shaft for applying varying pressure between the two said clutch elements for effecting, upon increasing output shaft speed, an increasing torque transmission through said clutch parallel to the transmission of torque by said impeller and turbine assembly and including a piston and cylinder means disposed coaxially about the output shaft.

8. In an automatic fluid operated transmission system, a fluid coupling unit comprising a torque input shaft, a driven torque output shaft, a fluid impeller on said input shaft and a fluid driven turbine on said output shaft, a direct drive clutch mechanism operatively disposed between the input shaft and the turbine, a casing enclosing said clutch and impeller and said turbine, a torque boosting slip clutch comprising a clutch element secured for rotation with said torque input shaft and a second clutch element carried by said torque output shaft, speed responsive means linked to the output shaft for applying varying pressure between the two said clutch elements for effecting with increasing output shaft speed an increasing torque transmission through said slip clutch parallel to the transmission of torque by said impeller and turbine, said speed responsive means comprising a hydraulic piston and cylinder assembly operatively disposed between the direct and slip clutches and adapted to apply pressure to said torque boosting slip clutch members and to the direct drive clutch upon admission of hydraulic pressure thereto for operating the slip and direct drive clutch successively and cumulatively, means located between said output shaft and the first said clutch whereby the first said clutch is biased from engagement, a channel system in said output shaft for introducing hydraulic fluid to said assembly and a centrifugally responsive valving means carried on said output shaft for controlling the flow of hydraulic fluid to said hydraulic assembly.

9. In an automatic fluid operated transmission system, a fluid coupling unit comprising a torque input shaft, a torque output shaft, a fluid impeller on the input shaft, a turbine on the output shaft driven by fluid from said impeller, a casing enclosing said impeller and turbine, a slip clutch mechanism operatively disposed between the casing and the output shaft, a direct drive clutch comprising a clutch member on said input shaft, and a second clutch member on said output shaft, one of said clutch members being movable relative to the other for engagement therewith, speed responsive means on the output shaft responsive to the speed thereof for effecting an engagement of said clutch members at a predetermined speed of said output shaft, said speed responsive means comprising a hydraulic piston and cylinder assembly disposed about said output shaft in said casing and connected to the movable direct drive clutch member and to an element of the slip clutch mechanism and spring means located between the movable one of said clutch members and its corresponding shaft restraining the said movable clutch member from engagement until a predetermined output shaft speed is attained, whereby sequentially force is applied to said slip clutch to reduce slip and said movable member is moved into ultimate engagement by application of fluid pressure within said assembly, a fluid channel system for introducing fluid pressure through the said output shaft to said assembly, and a centrifugally weight operated valve controlling the flow of fluid from said channel system to said assembly.

10. In an automatic fluid operated transmission system, a fluid coupling unit comprising a torque input shaft, a torque output shaft, a fluid impeller unit on the input shaft, a turbine unit on the output shaft driven by fluid from said impeller, a fluid-filled casing fixed to the input shaft and enclosing said impeller and turbine, said turbine being drivingly connected to but axially shiftable on the output shaft, a direct drive clutch comprising a clutch member on said drive shaft, a shiftable second clutch member on said driven shaft rigid with the turbine and shiftable therewith to clutch closing position as the impeller and turbine approach a synchornized speed, means interposed between such clutch members maintaining them out of engagement at speeds below said synchronized speed, speed responsive means on the driven shaft responsive to the speed thereof for effecting an engagement of said clutch members as said synchronized speed is substantially attained, a slip clutch mechanism drivingly disposed between the casing and the torque output shaft, said speed responsibe means including a hydraulic piston and cylinder assembly disposed about said driven shaft in said casing and connected to the movable direct drive clutch member and reactive upon the slip clutch mechanism whereby the slip and direct drive clutch mechanisms are successively and cumulatively brought into a driving engagement by application of fluid pressure within said assembly, a channel system for introducing fluid pressure through the said driven shaft to said assembly and a centrifugal weight operated valve controlling the flow of fluid from said channel system to said assembly.

11. In an automatic transmission mechanism having a fluid driven turbine on a driven output shaft and an impeller casing on the input shaft, the combination located in the casing of the output shaft, a clutch mechanism at the impeller side of the casing for connecting the input shaft directly to the output shaft, a second clutch mechanism located at the opposite turbine side of the casing and adapted to connect the casing drivingly to the output shaft, a fluid operated piston and cylinder means effective to operate both clutch mechanisms in axially opposite directions, centrifugally controlled valve means mounted on the output shaft, means located between said output shaft and the first said clutch mechanism whereby the first said clutch mechanism is restrained from engagement until a predetermined torque transmission is effected through the second clutch mechanism, a pressureized fluid passageway system leading to the piston and cylinder means and controlled by the valve means to cause the piston and cylinder means to operate the clutches successively and cumulatively to couple the input shaft, the casing, the impeller and the turbine into a unitarily revolving mass at a predetermined speed of the output shaft.

12. In a fluid operated transmission system including a fluid coupling driven by a motor, a hydraulically actuated clutch with driving clutch member on an output shaft of said coupling and a driven shaft and clutch member, a housing for the clutch and coupling providing a fluid sump; a pump within said housing drawing fluid from said sump, and a hydraulically powered and controlled gear shift unit coupled to the driven clutch shaft: a transmission control system comprising first fluid conduit means connecting the outlet of said pump to the power fluid inlet of said shifting unit and to said fluid coupling; second fluid conduit means supplying fluid to said clutch for the actuation thereof and to said shifting unit for control thereof; spring closed clutch exhaust relief and pump outlet relief valves opening to said sump; a solenoidally operated rotary valve normally biased to closed position provided with port and channels adapted when the rotary valve is in closed position to connect the first said conduit means to the pump outlet relief valve and the second conduit means to the clutch relief valve, and adapted when in open position to open the first said conduit means to the said second conduit means and to block both said conduit means from said relief valves whereby fluid is delivered from the pump to the second conduit means; motor control means including a switch closed when the said motor control means is set for a motor speed above a chosen idling speed; and a valve solenoid actuating circuit including said switch and the operating solenoid of said valve, whereby said rotary valve is moved to open position permitting said pump to apply fluid pressure to said coupling, to the control of said gear shift unit and to said clutch when the motor control means is above said idling speed setting and when said motor control means is at idling speed setting said valve is biased to said closed position to release fluid pressure from said clutch and said shifting unit control through said clutch relief valve and from said pump and first conduit means through said pump relief valve.

13. In a fluid operated transmission system including a motor driven fluid coupling having speed responsive hydraulically engaged positive drive clutch means, a hydraulically actuated clutch with driving clutch member on an output shaft of said coupling and a driven shaft and clutch member, a housing for the clutch and coupling providing a fluid sump, and a pump within said housing drawing fluid from said sump: a transmission control system comprising first fluid conduit means connecting the outlet of said pump to the positive drive clutch means of said fluid coupling; second fluid conduit means supplying fluid to the second said clutch for the actuation thereof; spring closed clutch exhaust relief and pump outlet relief valves opening to said sump; a solenoidally operated rotary valve normally biased to closed position provided with port and channels adapted when the rotary valve is in closed position to connect the first said conduit means to the pump outlet relief valve and the second conduit means to the clutch relief valve, and adapted when in open position to open the first said conduit means to the said second conduit means and to block both said conduit means from said relief valves; motor control means including a switch closed when the said motor control means is set for a motor speed above a chosen idling speed; and a valve solenoid actuating circuit including said switch and the operating solenoid of said valve, whereby said rotary valve is moved to open position permitting said pump to apply fluid pressure to the clutch means in said coupling and to the second said clutch when the motor control means is above said idling speed setting and when said motor control means is at idling speed setting said valve is biased to said closed position to release fluid pressure from the second said clutch through said clutch relief valve and from said pump and first conduit means through said pump relief valve.

14. In a control system as described in claim 13, a precision acting solenoid unit for operation of said rotary valve, comprising a base, a shaft journalled therein for rotating said rotary valve, a solenoid coil fixed to said base, an armature moved thereby when energized for rotating the valve to on position, spring means biasing the armature to an off position, a radially slotted projecting arm secured to said shaft, and a yoke member on said armature carrying a pin engaged in the slot of said arm, said yoke being formed relative to said arm to provide stop means limiting the travel of said yoke to extreme positions corresponding to shaft rotation positions setting said rotary valve to exact extreme off and on positions.

15. In a structure as described in claim 2, a ring valve comprising a body mounted on said driven shaft, said body having a fluid supply conduit in connection with said pump, fluid inlet passageway means opening to said piston and cylinder means and associated with said supply conduit, a fluid outlet conduit in connection with said housing, and fluid discharging passageway means opening to said piston and cylinder means and associated with said outlet conduit; and an annular valve member rotatably mounted on said body, said member and said inlet and discharge passageway means being formed relative to each other to provide a gradually increased valve opening from said supply conduit to said piston and cylinder means and also decreased valve opening from said piston and cylinder means to said outlet conduit when said valve member is rotated by said weight means toward its position at said predetermined speed.

References Cited in the file of this patent

UNITED STATES PATENTS

| | | |
|---|---|---|
| 1,203,265 | Radcliffe | Oct. 31, 1916 |
| 2,332,593 | Nutt et al. | Oct. 26, 1943 |
| 2,412,006 | Pedersen | Dec. 3, 1946 |

FOREIGN PATENTS

| | | |
|---|---|---|
| 622,368 | Great Britain | May 2, 1949 |
| 940,411 | France | Dec. 13, 1948 |
| 992,998 | France | Oct. 25, 1951 |